UNITED STATES PATENT OFFICE.

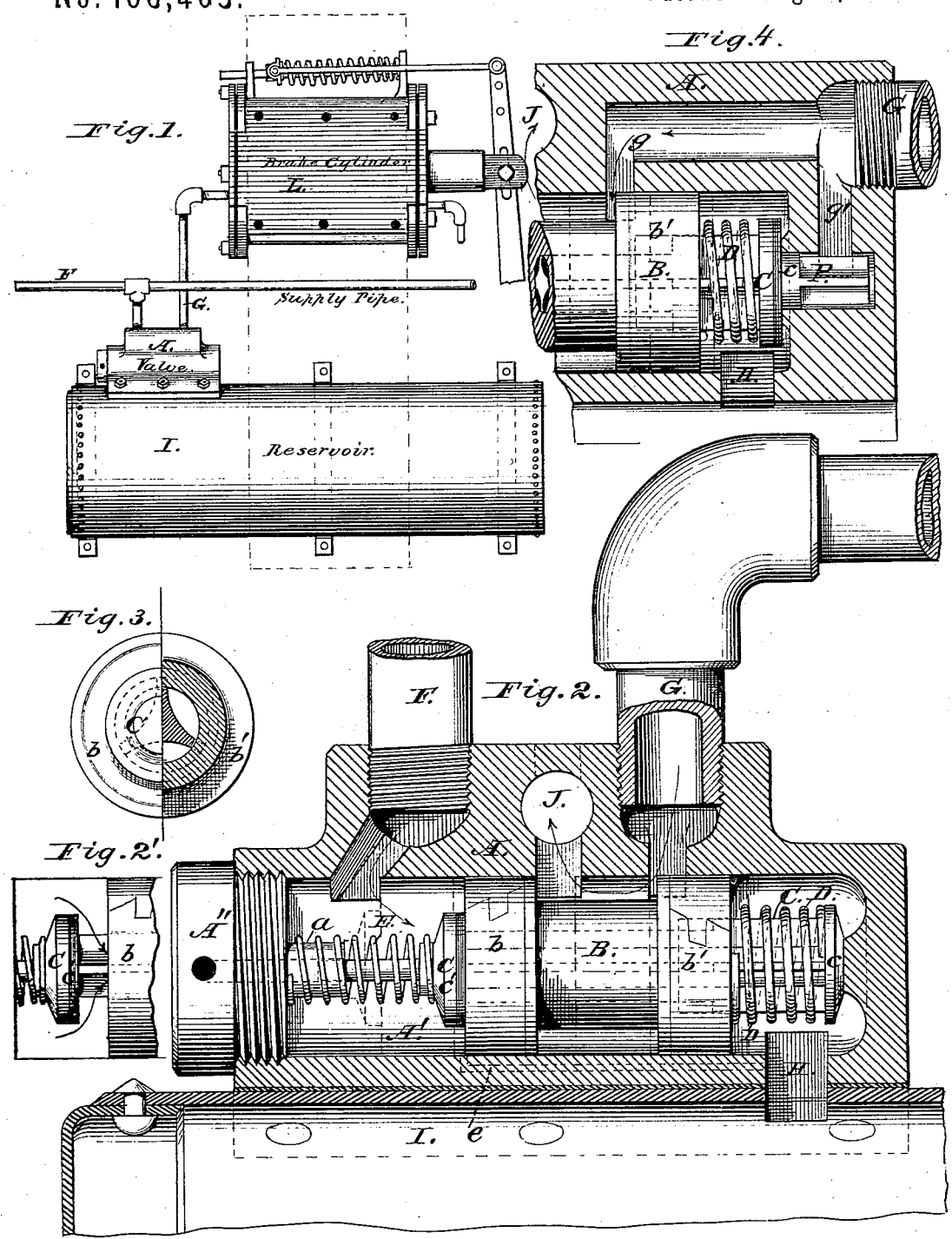

H. LANSING PERRINE, OF FREEHOLD, NEW JERSEY.

IMPROVEMENT IN AIR-BRAKES.

Specification forming part of Letters Patent No. 166,405, dated August 3, 1875; application filed July 29, 1875.

*To all whom it may concern:*

Be it known that I, H. LANSING PERRINE, of Freehold, in the county of Monmouth and State of New Jersey, have invented certain new and useful Improvements in Air-Brakes, of which the following is a full, clear, and exact specification:

This invention is in the nature of an improvement in single-acting air brakes, wherein each car is provided with an air-reservoir and a brake-cylinder, admission of air to both of which is controlled by an intermediately-located valve of peculiar construction, in such manner that, as air is being supplied through the pipes from the main reservoir at the locomotive, communication is open to the reservoir under each car, and cut off from the brake-cylinder, until the pressure in said reservoir equals that in the supply-pipes, when, if the pressure of air in the pipes is slacked or diminished, the valve opens the brake-cylinder inlet, and allows the air in the reservoir to escape into such cylinder and force on the brakes; and the invention consists in a tubular spring piston-valve operating in a chamber or shell having an inlet for the air, a reservoir-opening, and a combined supply and exhaust for the brake-cylinder, as hereinafter fully described.

Referring to the drawings, Figure 1 is a top or plan view of an air-brake mechanism with my valve a tached. Fig. 2 is a partly sectional view of the valve about full size. Fig. 2' is a side elevation of the front end of the valve open, or in position to allow air to flow into the reservoir. Fig. 3 is an end view of the valve in half-section and half-elevation. Fig. 4 is a sectional view of one end of the valve modified.

L represents a brake-cylinder, and I a reservoir, such as are usually attached to each car. A is a valve secured to or otherwise connected with said reservoir, and with the supply-pipe F, extending from the main reservoir on the locomotive, and further communicating with the brake-cylinder by a pipe, G. Within the casing or shell of valve A I make a chamber, A', and close its open end by a plug or nut, A''. In this chamber I make openings to receive the supply-pipe F and pipe G, leading to the brake-cylinder; also, an opening, H, leading into the reservoir. B is a valve having a hollow center, in which a supplemental spring-valve, C, is placed, on which the valve B moves back and forth. The valve B is made in the form of a piston, with two heads, $b$ $b'$, fitted with a peripheral steel or other packing, and connected by a stem of less diameter, and with a central cavity, in which fits the winged valve C. The valve C, near its rear end, is formed with a stop or shoulder, against which the valve B strikes in its backward movement, and is prevented from being forced back too far, whereby it might cover or close the reservoir-port H. This valve C has a packed flange or head, $c'$, for controlling the front of the opening in valve B, and said head is extended into a stem fitting into and guided by a socket, $a$, in the nut A'', and between said head $c'$ and nut is arranged on the stem a coiled or other spring, E. The other end of the valve C is made with a head, $c$, between which and the piston B is arranged a coiled or other spring, D. In filling the reservoir air is turned into the supply-pipe, which, entering the valve, presses back the piston B, so as to force it away from the head $c'$, and allow the air to pass through the hollow valve B into the reservoir through opening H. The brake-cylinder port is then, between the heads $b$ $b'$, cut off from communication with the reservoir and supply-pipe, and any air in said cylinder flows back through said pipe, and exhausts at port J. Now, when the pressure of air in the pipe F and reservoir is equalized, the supply may be withheld or withdrawn from said pipes, when the force of spring D, exerted against the valve B, will drive it up against head $c'$, and close said valve. This will carry head $b'$ the other side of the brake-cylinder port, and establish communication between the reservoir and said brake-cylinder, and set the brakes. The spring E serves simply to insure an easy and accurate working of the valves B C.

It will be seen that the valves B C combine to make a double-acting valve with relation to the reservoir and cylinder.

When the brakes are to be let off, the air is turned into the pipes F, and the first-described operation repeated, springs or other means being employed to retract the brakes.

The modification illustrated in Fig. 4 shows ports $g g'$, for supplying air to the cylinder. Port $g$ is controlled by head $b'$, and port $g'$ by a winged plunger, P, working in a recess at right angles to said port, and operated by its connection with valve C. This insures a quick supply to the cylinder, and the spring E can be dispensed with.

Provision for any necessary movement of valve C is made by extending the socket $a$. It may be necessary to make an opening or way, $e$, leading from the reservoir to the front of the valve-casing, in order to insure the equalization of pressure on the piston-valve that may be lacking by reason of leakage in the pipes or elsewhere.

I am aware that it is not new in air-brakes to use a hollow piston-valve having an inclosed check-valve opening with the pressure, and, therefore, I make no claim to the same; but,

Having thus described my invention, what I claim is—

The combination, with the valve-casing, having ports arranged substantially as described, of the hollow piston-valve and a supplemental wing-valve, the latter, when serving to admit air to the reservoir, opening against the pressure, as and for the purpose set forth.

To the above specification of my invention I have signed my name this 29th day of July, A. D. 1875.

H. LANSING PERRINE.

Witnesses:
WM. H. FINCKEL,
A. C. BRADLEY.